United States Patent
Luk et al.

(10) Patent No.: US 9,498,035 B2
(45) Date of Patent: *Nov. 22, 2016

(54) SILICONE HYDROGEL CONTACT LENSES FOR SUSTAINED RELEASE OF BENEFICIAL POLYMERS

(71) Applicant: CooperVision International Holding Company, LP, St. Michael (BB)

(72) Inventors: Andrew Luk, Pleasanton, CA (US); Victoria Rogers, Pleasanton, CA (US); Junhao Ge, Pleasanton, CA (US); Hong Xue, Pleasanton, CA (US); Yuwen Liu, Pleasanton, CA (US); Arthur Back, Pleasanton, CA (US); Yun Zhang, Pleasanton, CA (US); Ying Ye, Irvine, CA (US); Peter Zhu, Los Altos, CA (US)

(73) Assignee: CooperVision International Holding Company, LP, St. Michael (BB)

(*) Notice: Subject to any disclaimer, the term of this patent is extended or adjusted under 35 U.S.C. 154(b) by 62 days.

This patent is subject to a terminal disclaimer.

(21) Appl. No.: 14/109,979

(22) Filed: Dec. 18, 2013

(65) Prior Publication Data

US 2014/0174962 A1 Jun. 26, 2014

Related U.S. Application Data

(60) Provisional application No. 61/740,606, filed on Dec. 21, 2012.

(51) Int. Cl.
*G02B 1/04* (2006.01)
*A45C 11/00* (2006.01)
*B65B 55/02* (2006.01)

(52) U.S. Cl.
CPC ............. *A45C 11/005* (2013.01); *B65B 55/02* (2013.01); *G02B 1/043* (2013.01)

(58) Field of Classification Search
CPC ....................................................... G02B 1/043
See application file for complete search history.

(56) References Cited

U.S. PATENT DOCUMENTS

| | | | | |
|---|---|---|---|---|
| 5,260,000 | A * | 11/1993 | Nandu et al. | 264/2.1 |
| 2006/0205621 | A1* | 9/2006 | Borazjani et al. | 510/161 |
| 2007/0149428 | A1* | 6/2007 | Ammon et al. | 510/112 |
| 2008/0063688 | A1* | 3/2008 | Wilcox et al. | 424/429 |
| 2009/0238948 | A1 | 9/2009 | Muller et al. | |
| 2012/0283353 | A1 | 11/2012 | Mahadevan et al. | |

FOREIGN PATENT DOCUMENTS

| | | |
|---|---|---|
| JP | 2011095575 A | 5/2011 |
| WO | 2008008752 A2 | 1/2008 |
| WO | 2009145842 A2 | 12/2009 |

OTHER PUBLICATIONS

International Search Report and Written Opinion issued in corresponding International Patent Application No. PCT/GB2013/053387 dated Aug. 1, 2014 (12 pages).

International Preliminary Report on Patentability issued in corresponding International Patent Application No. PCT/GB2013/053387 dated Dec. 23, 2014 (9 pages).

Communication Relating to the Results of the Partial International Search issued in corresponding International Patent Application No. PCT/GB2013/053387 dated Mar. 25, 2014 (4 pages).

* cited by examiner

*Primary Examiner* — Michael Pepitone
(74) *Attorney, Agent, or Firm* — Kilyk & Bowersox, P.L.L.C.

(57) ABSTRACT

Silicone hydrogel contact lenses comprising an ionic component sustain release of beneficial cationic polymers.

21 Claims, No Drawings

SILICONE HYDROGEL CONTACT LENSES FOR SUSTAINED RELEASE OF BENEFICIAL POLYMERS

This application claims the benefit under 35 U.S.C. §119 (e) of prior U.S. Provisional Patent Application No. 61/740,606, filed Dec. 21, 2012, which is incorporated in its entirety by reference herein.

BACKGROUND

The field of the disclosure is silicone hydrogel contact lenses for sustained release of beneficial polymers.

Contact lens packages including a sealed receptacle that contains a contact lens made of a silicone hydrogel copolymer in a sterile solution which comprises a stabilizing agent which can form an ionic complex or hydrogen bond with the hydrogel copolymer, have been described in U.S. Pat. Publ. No. 2007/0149428. A packaging system and method for the storage of an ionic hydrogel lens that uses an aqueous packing solution which includes a phosphorylcholine polymer, and which further can include a buffering agent, have been described in U.S. Pat. Publ. No. 2009/0100801. Other background publications include U.S. Pat. No. 4,168,112, U.S. Pat. No. 4,463,149, U.S. Pat. No. 6,187,264, U.S. Pat. No. 6,638,563, U.S. Pat. No. 7,037,469, U.S. Pat. No. 7,282,214, U.S. Pat. No. 7,402,318, U.S. Pat. No. 7,841,716, U.S. Pat. No. 7,960,465, U.S. Pat. No. 8,075,909, U.S. Pat. No. 8,079,703, U.S. Pat. Publ. No. 2004/0135967, U.S. Pat. Publ. No. 2005/0074467, U.S. Pat. Publ. No. 2007/0048249, U.S. Pat. Publ. No. 2007/0265247, U.S. Pat. Publ. No. 2008/0085922, U.S. Pat. Publ. No. 2008/0124376, U.S. Pat. Publ. No. 2010/0048847, U.S. Pat. Publ. No. 2010/0239637, U.S. Pat. Publ. No. 2010/0249356, U.S. Pat. Publ. No. 2011/0071091, U.S. Pat. Publ. No. 2012/0074352, U.S. Pat. Publ. No. 2012/0214899, EP Pat. No. 1328303B1, and PCT Publ. No. WO94/13774, Karlgard et al, Int J Pharm (2003) 257:141-51, and Soluri et al., Optom Vis Sci (2012) 89:1140-1149.

SUMMARY

In one aspect, the invention provides a silicone hydrogel contact lens that comprises a hydrated polymerization product of a monomer mixture comprising at least one silicone monomer and at least one anionic monomer that provides the polymerization product with an ionic content of about 0.6% to about 2.2%. A cationic polymer having a molecular weight of about 1,500 to 30,000 is electrostatically attached to the hydrated polymerization product. The contact lens sustains release of the cationic polymer for at least 2 hours. The cationic polymer can be an antimicrobial peptide, a comfort polymer, or other beneficial polymer. The contact lens is provided unworn and sealed in a package.

In another aspect, the invention provides a silicone hydrogel contact lens that comprises a hydrated polymerization product of a monomer mixture comprising at least one silicone monomer, at least one hydrophilic monomer selected from N-vinyl-N-methylacetamide (VMA), N-vinyl pyrrolidone (NVP), or a combination of both VMA and NVP, and at least one carboxylic-acid-containing monomer in an amount to provide the hydrated polymerization product with an ionic content of about 1.0% to about 2.2%. In one example, the carboxylic-acid containing monomer is selected from (meth)acrylic acid, acrylic acid, crotonic acid, and trimethylsilyl methacrylate.

In another aspect, the invention provides a method of manufacturing a silicone hydrogel contact lens comprising polymerizing the monomer mixture to provide a lens-shaped polymerization product; optionally hydrating the polymerization product to form a hydrogel; immersing the polymerization product or hydrogel in a package containing a packaging solution comprising the cationic polymer; sealing the package; and optionally sterilizing the sealed package by autoclave.

DETAILED DESCRIPTION

Ionic silicone hydrogel contact lenses that sustain release of beneficial polymers are disclosed herein. The contact lens comprises a polymerization product of a monomer mixture comprising at least one silicone monomer and at least one anionic monomer to provide the polymerization product with an ionic content of about 0.6% to about 2.2%. The polymerization product is hydrated to form a silicone hydrogel, and a cationic polymer having a molecular weight of about 1,500 to 30,000 is electrostatically attached to the hydrogel. The ionic content of the lens and the cationic polymer are selected to provide sustained release of the cationic polymer for at least 2 hours. The silicone hydrogel contact lens is provided unworn (i.e. it is a new lens, not having been previously used by a patient) sealed in a package, such as a blister package, glass vial, or other suitable container, containing a packaging solution in which the contact lens is immersed.

The monomer mixture comprises at least one silicone monomer and at least one anionic monomer. As used herein, the term "monomer mixture" refers to a mixture of polymerizable monomers together with any additional ingredients, including non-polymerizable ingredients, which are subjected to polymerization conditions to form a polymerization product. The term "monomer" refers to any molecule capable of reacting in a polymerization reaction with other molecules that are the same or different, to form a polymer or copolymer. Thus, the term encompasses polymerizable pre-polymers and macromers, there being no size-constraint of the monomer unless indicated otherwise. A silicone monomer comprises at least one Si—O group. Silicone monomers suitable for contact lenses are well-known in the field. Exemplary silicone monomers are described in U.S. Publ. No. 20120220689, incorporated herein by reference, and in Example 1 below. The presence of Si—O groups in a contact lens increases its oxygen permeability, making the lens more suitable for extended wear. Oxygen permeability (Dk) of a contact lens is measured in barrers using standard methods in the industry, such as by the method described by Chhabra et al. (2007), *A single-lens polarographic measurement of oxygen permeability (Dk) for hypertransmissible soft contact lenses*. Biomaterials 28: 4331-4342. In specific examples, the contact lens has an oxygen permeability of at least 35, 40, 50, 75, or 100.

Anionic monomers suitable for use in the monomer mixtures may comprise one or more carboxylate group, phosphate group, phosphonate group, phosphonic group, sulfonate group, sulfate group, sulfite group, and combinations thereof. Such groups are typically negatively charged at about pH 7. Non-limiting examples of carboxylic acid-containing anionic monomers that can be used include (meth)acrylic acid, acrylic acid, itaconic acid, crotonic acid, cinnamic acid, vinylbenzoic acid, fumaric acid, maleic acid, monoesters of fumaric acid, and N-vinyloxycarbonyl-L-alanine; phosphate group-containing anionic monomers include 2-hydroxyethyl acrylate phosphate, 4-hydroxybutyl acrylate phosphate, and vinyl phosphate; and sulfonate group-containing monomers include styrene sulfonate, 2-acrylamido-2-methylpropane sulfonic acid, vinyl sulfonate, and sulfoethyl methacrylate. As used herein, the term "anionic monomer" also includes monomers that can undergo hydrolysis to provide a negative charge at about pH 7. For example, trimethysilyl methacrylate (TMSMA) may be included in a monomer mixture and polymerized. When the resulting polymerization product is hydrated, the trimethylsilyl group hydrolyses to generate methacrylic acid (i.e. the structure of a polymerized methacrylic acid monomer). Anionic monomers comprising carboxylate groups are particularly suitable for use in the present invention. In one particular example, the carboxylic acid-containing anionic monomer is selected from (meth)acrylic acid, acrylic acid, crotonic acid, and trimethylsilyl methacrylate. Throughout this disclosure a reference to "examples", "an example", "one example", "a specific example" or similar phrase, is intended to introduce a feature or features of the silicone hydrogel, monomer mixture, anionic monomer, cationic polymer, method of manufacture, etc. (depending on context) that can be combined with any combination of previously-described or subsequently-described examples (i.e. features), unless a particular combination of features is mutually exclusive, or if context indicates otherwise.

The anionic monomer is included in the monomer mixture in an amount to provide the resulting contact lens with an ionic content of from about 0.6%, 0.8%, 1.0%, 1.2%, 1.4% or 1.6% up to about 2.0%, 2.2%, or 2.4%. As used herein a % ionic content is determined by Formula I:

$$\Sigma(a_n \times b_n/c_n) \times 89 = \% \text{ ionic content} \qquad (I)$$

where $a_n$ is the weight percentage, as defined below, of anionic monomer n used in the monomer mixture, $b_n$ is the number of negatively-charged groups on monomer n at pH 7 (for example, the number of carboxylate, phosphate, phosphonate, phosphonic, sulfonate, sulfate and sulfite groups in the monomer), and $c_n$ is the molecular weight of anionic monomer n. If more than one anionic monomer is used in a monomer mixture, the % ionic content of the resulting polymerization product is the sum of the % ionic content provided by each anionic monomer n. The weight percentage of the anionic monomer n in the monomer mixture is relative to the weight of all polymerizable components of the monomer mixture. In other words, ingredients of the monomer mixture that do not incorporate into the final contact lens, such as diluents that are removed from the hydrogel during the manufacturing process, are not included in the weight percent determination. Formula I adjusts for differences in molecular weight and charge relative to (meth)acrylic acid, an anionic monomer commonly used in non-silicone hydrogel contact lenses made from 2-hydroxyethyl methacrylate (HEMA). Methacrylic acid has a molecular weight of 89 and one ionic group. Thus, for example, the ionic content of a polymerization product of a composition that comprises 2.0 wt. % of N-vinyloxycarbonyl-L-alanine (MW=159, 1 ionic group) and no other anionic monomers is calculated as follows: $(2.0/159) \times (89) = 1.1\%$ ionic content. The ionic content of a hydrogel prepared from a composition that comprises 2.0 wt. % itaconic acid (MW=130, 2 ionic groups) and no other anionic monomers is calculated as follows: $(2.0 \times 2/130) \times 89 = 2.7\%$ ionic content. We have found that sustained release of cationic polymers can be achieved by balancing the ionic content of the contact lens to within the ranges described above.

Throughout this description, when a series of lower limit ranges and a series of upper limit ranges are provided, all combinations of the provided ranges are contemplated as if each combination were specifically listed. For example, in the above listing of ionic content percentages, all 18 possible percent ionic content ranges are contemplated (i.e. 0.6-2.0%, 0.8-2.0% ... 1.6%-2.2%, and 1.6%-2.4%). Further, throughout this disclosure, when a series of values is presented with a qualifier preceding the first value, the qualifier is intended to implicitly precede each subsequent value in the series unless context dictates otherwise. For example, for the values listed above, it is intended that the qualifier "from about" implicitly precedes the values 0.8, 1.0, 1.2, 1.4 and 1.6, and the qualifier "up to about" implicitly precedes the values 2.2 and 2.4. In various examples, the ionic content of the hydrogel is in the range of 1.0% to 2.2%, or 1.2% to 2.0%, or 1.4% to 1.8%. We have found, surprisingly, that silicone hydrogel contact lenses having an ionic content in these ranges can sustain release of certain cationic peptides, such as epsilon poly-l-lysine (εPLL), for at least 7 days.

The cationic polymer can be any cationic polymer that can be taken up by and released from the contact lens to provide a beneficial effect, such as enhanced comfort or antimicrobial properties. Exemplary cationic polymers include εPLL, antimicrobial peptides which comprise multiple arginine and/or lysine groups, polyhexamethylene biguanide (PHMB), and quaternary ammonium compounds (i.e. polyquats). The molecular weight of the cationic polymer is typically from about 1,000, 1,500, 2,000, 2,500, 3,000, 3,500, or 4,000, up to about 6,000, 8,000, 10,000, 15,000, 20,000, 25,000, or 30,000. In various examples, the molecular weight of the cationic polymer is from about 1,000 to about 5000, from about 4000 to about 15,000, or from about 15,000 to about 30,000. The term "molecular weight" as used herein, refers to the absolute number average molecular weight (in units of Daltons) of the polymer as determined by $^1$H NMR end-group analysis. In a specific example, the molecular weight of the cationic polymer is about 3,000 to 15,000. In a further example, the cationic polymer is an antimicrobial peptide having a molecular weight of about 2,500 to about 6,000. The cationic polymer can electrostatically attach to a polymerization product comprising anionic groups simply by immersing the polymerization product in a packaging solution that comprises the cationic polymer. The polymerization product may be dry, partially hydrated, or fully hydrated when immersed into the packaging solution.

In one example, the packaging solution, prior to contact with the polymerization product, comprises the cationic polymer in amounts of at least 50 ppm, 100 ppm, 150 ppm, 200 ppm, 250 ppm, or 300 ppm up to about 600 ppm, 800 ppm, 1000 ppm 1500 ppm, 2000 ppm, 3000, 5000, 7500, or 10,000 ppm. After the polymerization product is immersed in the packaging solution, at least some of the cationic polymer electrostatically attaches to the polymerization product, thereby reducing the concentration of the cationic polymer in the packaging solution. After the polymerization product is immersed in the packaging solution, the package is sealed and optionally sterilized. Suitable sterilization methods include autoclaving, gamma radiation, e-beam radiation, ultraviolet radiation, etc. In some examples, the hydrogel and packaging solution may be manufactured and combined using sterile conditions, such that a post-packaging sterilization step is unnecessary.

We have found that by decreasing the ionic strength of the packaging solution from what is conventionally used for contact lenses, uptake and/or retention of a cationic polymer by the polymerization product can be significantly increased, resulting in more efficient use of the cationic polymer. In various examples, the packaging solution has an ionic strength of less than about 0.15, 0.10, or 0.05 as calculated by the equation:

$$I = \frac{1}{2}\sum_{i=1}^{n} c_i z_i^2$$

where $c_i$ is the molar concentration of ion i (mol·dm$^{-3}$), $z_i$ is the charge number of that ion, and the sum is taken over all ions in the packaging solution.

To reduce ionic strength while maintaining proper osmolality in the range of about 200, 250, or 270 mOsm/kg up to about 310, 350, or 400 mOsm/kg, sodium chloride, which is commonly used as a tonicity agent in contact lens packaging solutions, can be replaced with a non-electrolyte tonicity agent such as sorbitol, as indicated above. Other non-electrolyte tonicity agents that can be used in the packaging solution include mannitol, sucrose, glycerol, propylene glycol, xylitol, and inositol. Additionally or alternatively, the ionic strength of a packaging solution can be reduced by substituting the phosphate or borate buffer used in conventional contact lens packaging solutions with a lower ionic strength buffer such as TRIS and/or tricine. Example 5 below further demonstrates that lowering the ionic strength of a packaging solution comprising ePLL can result in increased uptake of ePLL by the hydrogel. In some examples, the packaging solution consists, or consists essentially, of an aqueous solution of a buffer, a tonicity agent, and the cationic polymer. In other examples, the packaging solution contains additional agents such as one or more antimicrobial agents, a comfort agent, a hydrophilic polymer, or a surfactant or other additive that prevents the lens from sticking to the container. The packaging solution typically has a pH in the range of about 6.8 or 7.0 up to about 7.8 or 8.0.

The silicone hydrogel contact lens sustains release of the cationic polymer for at least 2 hours. As used herein, reference to an amount of cationic polymer released refers to the amount of the cationic polymer released from the contact lens for a given duration of time as tested in an in vitro release assay substantially as described in Example 4. A contact lens is said to exhibit "sustained release" of the cationic polymer for at least a given duration of time if there is a significant increase in amount of the cationic polymer between the end of that given duration of time and the next time duration of the in vitro release assay. For example, if a contact lens releases 30 µg ePLL between 0-2 hours, and releases an additional 10 µg ePLL between 2-4 hours, as determined using the in vitro release assay, the hydrogel is said to sustain release of ePLL for at least 2 hours. In some examples, the hydrogel sustains release of a cationic polymer for at least 4 hours, 6 hours, 8 hours, or 24 hours. The in vitro release assay is used to approximate the release profile of the cationic polypeptide during normal wear of the contact lens. The ionic content of the polymerization product and the concentration of cationic polymer in the packaging solution can be balanced to provide desirable release profiles. In one example, the cationic polymer is an antimicrobial peptide, and the contact lens releases at least 1 µg, 5 µg, 10 µg, 20 µg, 30 µg or 40 µg of the antimicrobial peptide and up to about 60 µg, 80 µg, or 100 µg of the antimicrobial peptide in 2 hours. In a further example, the contact lens exhibits sustained release of the antimicrobial peptide, releasing the above-mentioned amounts by 2 hours and releasing an additional 1 µg, 5 µg, 10 µg or 20 µg and up to about 30 µg, 40 µg, or 60 µg of the antimicrobial peptide between 2 and 4 hours. In some examples, the hydrogel has a release profile in which release of the cationic polymer is sustained for at least 12 hours, i.e. the contact lens exhibits significant release of the cationic polymer between the 12 and 24 hour time points as determined using the in vitro release assay. Thus, a contact lens may continue to provide a benefit from release of the cationic polymer when worn overnight. For example, surprisingly, we have found that silicone hydrogel contact lenses described herein having an ionic content of about 1.6% to about 2.0%, when packaged in a solution comprising about 200 to about 1000 ppm ePLL can be subjected to in vitro release for 7 days and remain antimicrobially-effective.

Known methods of manufacturing silicone hydrogel contact lenses can be used to manufacture the silicone hydrogel contact lenses described herein. Exemplary methods are described in U.S. Pat. No. 6,867,245, to Iwata et al., U.S. Pat. No. 8,129,442 to Ueyama et al., and U.S. Publ. No. 20120220689 to Yao et al, incorporated herein by reference. Thus, one aspect of the present disclosure is a method of manufacturing an unworn silicone hydrogel contact lens, said method comprising: polymerizing a monomer mixture comprising at least one silicone monomer and at least one anionic monomer to provide a lens-shaped polymerization product having an ionic content of about 0.6% to about 2.2%; optionally hydrating the polymerization product to form a hydrogel; immersing the hydrogel or pre-hydrated polymerization product in a package containing a packaging solution comprising a cationic polymer having a molecular weight of about 1,500 to 30,000; and sealing the package, wherein the cationic polymer electrostatically attaches to the polymerization product, and wherein the contact lens sustains release of the cationic polymer for at least 2 hours as determined in an in vitro release assay. The manufacturing method may optionally comprise the additional step of sterilizing the sealed package, for example, by autoclave. Generally, the final manufactured product includes at least a sealed container containing an unused contact lens immersed in an aqueous lens packaging solution comprising a cationic polymer in accordance with the above-described examples. The sealed container may be a hermetically sealed blister-pack, in which a concave well containing a contact lens is covered by a metal or plastic sheet adapted for peeling in order to open the blister-pack. The sealed container may be any suitable inert packaging material providing a reasonable degree of protection to the lens, such as a plastic material such as polyalkylene (e.g., polyethylene or polypropylene), PVC, polyamide, and the like.

In one example, the silicone hydrogel contact lens is a hydrated polymerization product of a monomer mixture comprising at least one silicone monomer, at least one carboxylic-acid-containing monomer in an amount that provides the hydrated polymerization product with an ionic content of about 1.0%, 1.4% or 1.6% up to about 1.8%, 2.0% or 2.2%, and at least one hydrophilic monomer selected from N-vinyl-N-methylacetamide (VMA), N-vinyl pyrrolidone (NVP), or a combination of both VMA and NVP. In further examples, the monomer mixture comprises about 25, 30, or 35 wt. % up to about 55, 60, or 65 wt. % of the hydrophilic monomer.

The carboxylic-acid containing monomer may be any of the above-described carboxylic acid-containing monomers. In a specific example, the carboxylic-acid containing monomer is selected from (meth)acrylic acid, acrylic acid, crotonic acid, and trimethylsilyl methacrylate (TMSMA), and combinations thereof. As used herein, TMSMA is considered a carboxylic acid-containing monomer because during hydration, TMSMA undergoes a hydrolysis in which the trimethylsilyl (TMS) group leaves resulting in (meth)acrylic acid. Thus, upon hydration of a polymerization product made from a monomer mixture comprising TMSMA carboxylic acid groups are generated. We have found that ionic silicone hydrogel lenses made with VMA and/or NVP have better wettability if the monomer used to provide the anionic content is TMSMA compared to lenses having the same ionic content formulated with meth(acrylic acid) and VMA and/or NVP. Further, such TMSMA-containing lens formulations when cured in a hydrophobic mold, such as polypropylene, can have higher uptake of the cationic polymer, compared to lenses formulated with (meth)acrylic acid.

In specific examples, the silicone hydrogel contact lens is capable of sustaining release of ePLL for at least 6, 8, 12, or 24 hours as determined using the in vitro assay as described in Example 4. In a further example, the silicone hydrogel contact lens is packaged in a packaging solution having an ionic strength of less than about 0.15, 0.10, or 0.05. In a further example, the silicone hydrogel contact lens further comprises a cationic polymer electrostatically attached to the lens. In various examples, the cationic polymer has a molecular weight of 1,000, 1,500, 2,000, 2,500, 3,000, 3,500, or 4,000, up to about 6,000, 8,000, 10,000, 15,000, 20,000, 25,000, or 30,000, and the contact lens sustains release of the cationic polymer for at least 2 hours.

In the case of contact lenses intended for daily wear, in which the lens is removed and stored in a multi-purpose contact lens care solution (MPS) overnight, the beneficial property provided by the cationic polymer may be replenished or enhanced by inclusion of additional cationic polymer in the MPS which can incorporate into the contact lens during the overnight storage. Thus, methods are provided herein for replenishing or enhancing the beneficial properties of anionic silicone hydrogel contact lenses described herein after they have been worn. The method comprises storing a worn contact lens in a multi-purpose contact lens care solution (MPS) that comprises an additional amount of the cationic which incorporates into the contact lens during the storage.

The following Examples illustrate certain aspects and advantages of the present invention, which should be understood not to be limited thereby.

Example 1

Preparation of Anionic Silicone Hydrogel Contact Lenses

Six silicone hydrogel formulations, A-F, were made by weighing and mixing together the chemicals listed in Table 1 below in the relative parts (by weight) indicated and filtered using a 0.2-5.0 micron filter. The mono-functional siloxane listed in the Table 1 has structure II shown below. Methods of making this siloxane monomer are described in U.S. Pat. No. 8,168,735 to Ichinohe.

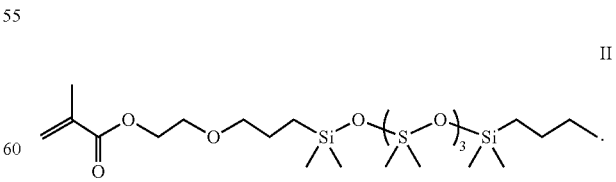

The bi-functional siloxane macromer listed in Table 1 has structure III shown below, wherein n is about 90, m is about 5 and p is about 7.0. Methods of making this macromer are described in U.S. Pat. No. 8,129,442 to Ueyama et al.

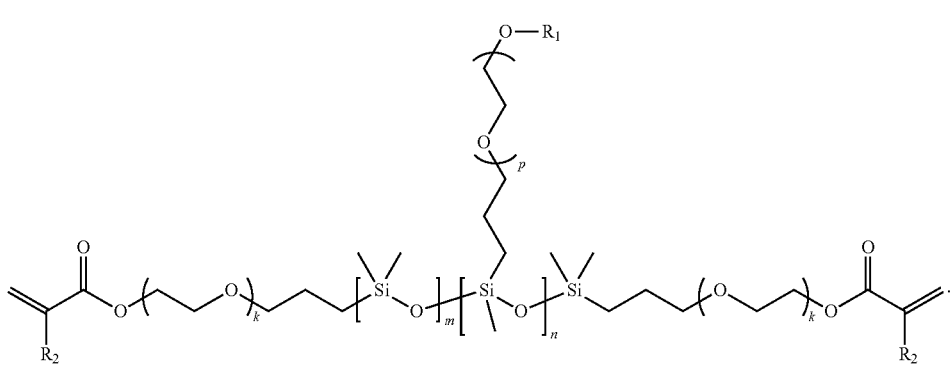

TABLE 1

| Chemical | Parts by wt. Formulation # | | | | | |
|---|---|---|---|---|---|---|
| | A | B | C | D | E | F |
| (meth)acrylic acid | 0 | 1.4 | 1.8 | 2.4 | 3.0 | 1.8 |
| mono-functional siloxane monomer | 26 | 26 | 26 | 26 | 26 | 29 |
| bi-functional siloxane macromer | 10 | 10 | 10 | 10 | 10 | 8 |
| N-vinyl-N-methylacetamide | 45 | 45 | 45 | 45 | 45 | 45 |
| methyl methacrylate | 12 | 12 | 12 | 12 | 12 | 8 |
| 1,4-butanediol vinyl ether | 5 | 5 | 5 | 5 | 5 | — |
| diethylene glycol vinyl ether | — | — | — | — | — | 5 |
| ethylene glycol methyl ether methacrylate | 2 | 2 | 2 | 2 | 2 | 6 |
| ethylene glycol dimethacrylate | — | — | — | — | — | 0.6 |
| triethylene glycol dimethacrylate | 1.2 | 1.2 | 1.2 | 1.2 | 1.2 | — |
| triethyleneglycol divinyl ether | 0.2 | 0.2 | 0.2 | 0.2 | 0.2 | 0.1 |
| Norbloc (CAS no. 96478-09-0) | — | — | — | — | — | 1.7 |
| Diphenyl (P-vinylphenyl) phosphine (CAS no. 40538-11-2) | 0.5 | 0.5 | 0.5 | 0.5 | 0.5 | 0.5 |
| Reactive Blue 247 (CAS Reg. No. 109561-07-1) | — | — | — | — | — | 0.01 |
| Vazo-64 (CAS reg. No. 78-67-1) | 0.5 | 0.5 | 0.5 | 0.5 | 0.5 | 0.5 |
| 2-Allyloxy ethanol | — | — | — | — | — | 0.8 |

The resulting polymerizable monomer mixtures were cast molded in polypropylene contact lens mold assemblies and thermally cured in a nitrogen oven using conventional methods. Each cured lens was removed from its mold and hydrated and washed using multiple exchanges of deoinized water to remove unreacted and partially reacted components from the hydrogel.

Example 2

In Vitro Uptake Assay ePLL at a concentration of 25% in water (Chisso Corporation, Tokyo, Japan) was used as a starting ePLL material in the following examples. Lenses of Formulation F prepared according to Example 1 were transferred to 6 ml glass vials containing either 1.2 ml PBS (control lens) or 1.2 ml 500 ppm ePLL in PBS. Unless indicated otherwise, references herein to PBS mean 29 mM PBS at pH 7.5 with an ionic strength of about 0.21 (0.78 wt. % NaCl, 0.05 wt. % sodium phosphate monobasic, and 0.36 wt. % sodium phosphate dibasic). The vials were sealed and autoclaved at 120° C. for 30 minutes. Additionally, vials containing 1.2 ml 500 ppm ePLL in PBS with no lens (control vial) were also autoclaved. The amounts of ePLL present in the post-autoclave solution of the test lens vial and in the control vial were determined by cationic size exclusion chromatography using a sample injection volume of 20 an Eprogen CAT-SEC300 5μ 250×4.6 MM, at room temperature, and a flow rate of 1.0 ml/min using 0.2M NaCl/0.1% TFA in $H_2O$ isocratically.

The amount of ePLL taken up by the lenses was calculated by subtracting the amount of ePLL present in the post-autoclave solution of the test lens vial from the amount of ePLL present in the control vial. The average uptake was about 200 μg ePLL/lens.

Example 3

Affect of Ionic Content of Contact Lens on Uptake of ePLL

Three lenses of each of Formulations A, and C-E prepared according to Example 1 were used in this study. Excess solution was removed from each lens by gently blotting with an absorbent tissue. Each lens was immersed in an individual well of a 12-well plate containing 1.2 ml of 500 ppm ePLL in PBS. The plates were shaken for 48 hours at 100 rpm at a temperature of 25±2° C. The amount of ePLL taken up by each lens was calculated by subtracting the final concentration of ePLL from the initial concentration and multiplying by 1.2 (ml PBS). Formulation A lenses took up about 5 μg ePLL, C lenses took up about 220 μg ePLL, D lenses took up about 340 μg ePLL, and E lenses took up about 420 μg ePLL.

Example 4

In Vitro Release Assay—Affect of Ionic Content on ePLL Release

Lenses of Formulations B-E prepared according to Example 1 were used in this study. The lenses were immersed in 1.2 ml of 500 ppm ePLL in PBS for 48 hours as described in Example 3. Excess solution was removed from each lens by gently blotting with an absorbent tissue.

Each lens was immersed in 1 ml of ISO 10344 standard saline solution (0.83% sodium chloride, 0.0467% sodium phosphate monobasic, and 0.4486% sodium phosphate dibasic) in a well of a 12-well plate and covered. The plates were shaken at 100 rpm at 37±2° C. At 2, 4, 6, 8, 12, and 24 hours, the solution was removed from each well and replaced with 1 ml of fresh ISO 10344 standard saline solution. HPLC was used to determine the amount of εPLL released from each lens. Table 2 shows the average cumulative amount (in μg) of εPLL released from the lens at each time point as well as the cumulative percentage of εPLL released relative to total amount of εPLL taken up by the lens.

TABLE 2

| Time (hr) | B μg | % | C μg | % | D μg | % | E μg | % |
|---|---|---|---|---|---|---|---|---|
| 2 | 28 ± 3 | 24 | 27 ± 4 | 13 | 17 ± 1 | 5 | 13 ± 3 | 3 |
| 4 | 48 ± 2 | 28 | 40 ± 8 | 20 | 34 ± 5 | 11 | 20 ± 2 | 5 |
| 6 | 57 ± 3 | 43 | 60 ± 13 | 29 | 50 ± 5 | 16 | 20 ± 2 | 5 |
| 8 | 58 ± 2 | 50 | 67 ± 6 | 33 | 50 ± 4 | 16 | 20 ± 2 | 5 |
| 12 | 58 ± 2 | 50 | 81 ± 6 | 40 | 50 ± 4 | 16 | 20 ± 2 | 5 |
| 24 | 62 ± 6 | 53 | 88 ± 5 | 43 | 50 ± 4 | 16 | 21 ± 2 | 5 |

Only the lenses of Formulation C, which had 1.7% ionic component (provided from (meth)acrylic acid) sustained release of the εPLL for the entire duration of the assay. In contrast, Formulation B lenses, with 1.35% ionic content, released about the same amount of εPLL during for the first 6 hours, but had little, if any release after 6 hours. Interestingly, lenses of Formulation D, which had 2.3% ionic component and took up about 50% more εPLL than Formulation C lenses, released less εPLL than Formulation C lenses. As with Formulation B lenses, there was little, if any, release of εPLL after 6 hours. Even more striking, Formulation E lenses, which had 2.85% ionic content, and took up about twice as much εPLL as did Formulation C lenses, released the least amount of εPLL at the 2 and 4 hour time points, and released little if any εPLL after 4 hours. The results show that sustained release of εPLL can be achieved by balancing the ionic content of the lens.

To use the in vitro release assay to test for εPLL release beyond the 24 hour time point, the saline solution is removed and replaced every 24 hours (i.e. at 48 hours, 72 hours, 96 hours, etc.) and the plates shaken at 100 rpm at 37±2° C., as described above.

Example 5

Affect of Ionic Strength of Packaging Solution on εPLL Uptake by Ionic Silicone Hydrogel Contact Lenses Lenses of formulation F prepared according to Example 1 were transferred to 6 ml glass vials containing 1.2 ml 500 ppm εPLL in either PBS or deionized water. The vials were then sealed and autoclaved. As determined using the methods described in Example 2, the lenses packaged in PBS took up an average of 233 μg εPLL from the packaging solution, which represented 39% of the total εPLL available in the packaging solution. In surprising contrast, the lenses packaged in deionized water took up on average 575 μg εPLL, which represented 96% of the available εPLL. The study was repeated substituting the deionized water with the TRIS/sorbitol buffers shown in Tables 8 and 9 below:

TABLE 8

19 mM TRIS Buffer (pH 7.30) with 2% Sorbitol

| Components | Target Wt. (g) | % |
|---|---|---|
| TRIS (hydroxymethyl) Amino Methane ($C_4H_{11}NO_3$) | 0.23 | 0.02 |
| Trizma Hydrochloride ($C_4H_{11}NO_3 \cdot HCL$) | 2.75 | 0.27 |
| Sorbitol ($C_6H_{14}O_6$) | 20.00 | 1.96 |
| deionized $H_2O$ | 1000.00 | 97.75 |
| Total | 1022.98 | 100.00 |

TABLE 9

19 mM TRIS Buffer (pH 7.30) with 5% Sorbitol

| Components | Target Wt. (g) | % |
|---|---|---|
| TRIS (hydroxymethyl) Amino Methane ($C_4H_{11}NO_3$) | 0.23 | 0.02 |
| Trizma Hydrochloride ($C_4H_{11}NO_3 \cdot HCL$) | 2.75 | 0.26 |
| Sorbitol ($C_6H_{14}O_6$) | 50.00 | 4.75 |
| deionized $H_2O$ | 1000.00 | 94.97 |
| Total | 1052.98 | 100.00 |

On average, the lenses packaged in the TRIS/sorbitol buffers of Tables 8 and 9 took up 408 μg and 386 μg εPLL, respectively.

Example 6

Uptake and Release of Polymers of Varying Molecular Weight Uptake by Ionic Silicone Hydrogel Lenses Solutions of 500 ppm poly-L-lysine hydrobromide (CAS No. 25988-63-0) (αPLL) with varying molecular weight ranges were prepared in PBS. Lenses of Formulation C prepared as described in Example 1 were packaged with 1.8 ml of each solution and autoclaved. After autoclave and overnight storage at room temperature uptake of αPLL was measured. The results are shown in Table 9.

TABLE 9

| αPLL mol. wt. range | uptake (μg/lens) |
|---|---|
| 500-2K | 122 |
| 1K-5K | 142 |
| 4K-15K | 400 |
| 15K-30K | 414 |
| 30K-70K | 299 |
| 70K-150K | 185 |

Polymer release was tested substantially as described in Example 4, except that the time points tested were at 2, 6, and 24 hr. No significant release of the 70K-150K polymer was detected. Release of polymer having a molecular weight range of 500-2K and 1K-5K was sustained for at least two hours, with no significant release observed between the 6 hour and 24 hour time points. In contrast, polymer having a molecular weight range of 4K-15K and 15K-30K exhibited significant release between the 6 hour and 24 hour time points.

TABLE 10

|  | 2 hr | | 6 hr | | 24 hr | |
| --- | --- | --- | --- | --- | --- | --- |
|  | µg | % | µg | % | µg | % |
| 500-2K | 51 | 42 | 66 | 54 | 66 | 54 |
| 1K-5K | 67 | 47 | 74 | 52 | 74 | 52 |
| 4K-15K | 14 | 4 | 24 | 6 | 40 | 10 |
| 15K-30K | 2 | 0.5 | 2 | 0 | 17 | 4 |
| 30K-70K | 0.5 | 0.2 | 0.5 | 0 | 5 | 3 |
| 70K-150K | 5 | 3 | 0.6 | 0 | 11 | 6 |

Although the disclosure herein refers to certain illustrated examples, it is to be understood that these examples are presented by way of example and not by way of limitation. The intent of the foregoing detailed description, although discussing exemplary examples, is to be construed to cover all modifications, alternatives, and equivalents of the examples as may fall within the spirit and scope of the invention as defined by the additional disclosure.

A number of publications and patents have been cited hereinabove. Each of the cited publications and patents are hereby incorporated by reference in their entireties.

The invention further provides:

1. A sealed package containing a silicone hydrogel contact lens immersed in a packaging solution, said contact lens comprising:

a) a hydrated polymerization product of a monomer mixture comprising at least one silicone monomer and at least one anionic monomer in an amount to provide the polymerization product with an ionic content of about 0.6% to about 2.2%, the ionic content being the sum of the % ionic content provided by each anionic monomer n as determined by Formula I:

$$\Sigma(a_n \times b_n/c_n) \times 89 = \% \text{ ionic content} \qquad (I)$$

where $a_n$ is the weight percentage of the anionic monomer n in the monomer mixture relative to the weight of all components of the monomer mixture that incorporate into the hydrogel, $b_n$ is the number of negatively-charged groups on monomer n at pH 7 (for example, the number of carboxylate, phosphate, phosphonate, phosphonic, sulfonate, sulfate and sulfite groups in the monomer), and $c_n$ is the molecular weight of ionic monomer n; and b) a cationic polymer having a molecular weight of about 1,500 to 30,000. The cationic polymer advantageously electrostatically attaches to the hydrated polymerization product. Advantageously, the contact lens sustains release of the cationic polypeptide for at least two hours upon being worn by a patient.

2. The package of 1, wherein the at least one anionic monomer is selected from (meth)acrylic acid, acrylic acid, crotonic acid, and trimethylsilyl methacrylate.

3. The package of 1 or 2, wherein the hydrated polymerization product has an ionic content of about 1.0% to about 2.0%.

4. The package of 1 or 2, wherein the hydrated polymerization product has an ionic content of about 1.6% to about 1.8%.

5. The package of any one of 1 to 4, wherein the cationic polymer has a molecular weight of about 3,000 to 15,000.

6. The package of any one of 1 to 5, wherein the cationic polymer is an antimicrobial peptide.

7. The package of any one of 1 to 6, wherein the monomer mixture further comprises at least one hydrophilic monomer selected from N-vinyl-N-methylacetamide (VMA), N-vinyl pyrrolidone (NVP), or a combination thereof.

8. The package of any one of 1 to 6, wherein the monomer mixture comprises about 35 wt. % to about 55 wt. % of VMA.

9. A sealed package containing a silicone hydrogel contact lens immersed in a packaging solution, said contact lens comprising a hydrated polymerization product of a monomer mixture comprising: at least one silicone monomer; at least one hydrophilic monomer selected from N-vinyl-N-methylacetamide (VMA), N-vinyl pyrrolidone (NVP), or a combination of both VMA and NVP; and at least one carboxylic-acid-containing monomer in an amount to provide the hydrated polymerization product with an ionic content of about 1.0% to about 2.2%, the ionic content being the sum of the % ionic content provided by each anionic monomer n as determined by Formula I:

$$\Sigma(a_n \times b_n/c_n) \times 89 = \% \text{ ionic content} \qquad (I)$$

where $a_n$ is the weight percentage of the anionic monomer n in the monomer mixture relative to the weight of all components of the monomer mixture that incorporate into the hydrogel, $b_n$ is the number of negatively-charged groups on monomer n at pH 7 (for example, the number of carboxylate groups in the monomer), and $c_n$ is the molecular weight of ionic monomer n.

10. The package of 9, wherein the carboxylic-acid-containing monomer is selected from (meth)acrylic acid, acrylic acid, crotonic acid, and trimethylsilyl methacrylate.

11. The package of 9 or 10, wherein the hydrated polymerization product has an ionic content of about 1.0% to about 2.0%.

12. The package of 9 or 10, wherein the hydrated polymerization product has an ionic content of about 1.6% to about 1.8%.

13. The package of any one of 9 to 12, wherein the monomer mixture comprises about 25 wt. % to about 75 wt. % of the hydrophilic monomer.

14. The package of any one of 9 to 12, wherein the monomer mixture comprises about 35 wt. % to about 55 wt. % of VMA.

15. The package of any one of 9 to 14, further comprising a cationic polymer having a molecular weight of about 1,500 to 30,000. The cationic polymer advantageously electrostatically attaches to the hydrated polymerization product. Advantageously, the contact lens sustains release of the cationic polypeptide for at least two hours upon being worn by a patient.

16. A method of replenishing a contact lens with cationic polymer after it has been worn, comprising storing the worn contact lens in a multi-purpose contact lens care solution (MPS) that comprises additional cationic polymer, wherein the additional cationic polymer incorporates into the contact lens during the storage. The contact lens may, for example, be as defined in any one of 1 to 8 or 15 above.

17. A method of manufacturing the silicone hydrogel contact lens of any one of 1 to 15 above, said method comprising: polymerizing the monomer mixture to provide a lens-shaped polymerization product; optionally hydrating the polymerization product to form a hydrogel; immersing the polymerization product or hydrogel in the packaging solution; sealing the package; and optionally sterilizing the sealed package by autoclave.

18. The method of 17, wherein the monomer mixture comprises TMSMA and wherein the monomer mixture is polymerized in a polypropylene mold.

We claim:

1. An unworn silicone hydrogel contact lens immersed in a packaging solution and sealed in a package, said contact lens comprising:
   a) a hydrated polymerization product of a monomer mixture comprising at least one silicone monomer and at least one anionic monomer in an amount to provide the polymerization product with an ionic content of about 0.6% to about 2.2%; and
   b) a cationic polymer having a molecular weight of about 1,500 to 30,000 electrostatically attached to the hydrated polymerization product, wherein the contact lens sustains release of the cationic polymer for at least 6 hours.

2. The contact lens of claim 1, wherein the at least one anionic monomer is selected from (meth)acrylic acid, acrylic acid, crotonic acid, and trimethylsilyl methacrylate.

3. The contact lens of claim 1, wherein the ionic content is about 1.0% to about 2.0%.

4. The contact lens of claim 1, wherein the ionic content is about 1.6% to about 1.8%.

5. The contact lens of claim 1, wherein the cationic polymer has a molecular weight of about 3,000 to 15,000.

6. The contact lens of claim 1, wherein the cationic polymer has a molecular weight of about 15,000 to 30,000.

7. The contact lens of claim 1, wherein the cationic polymer is an antimicrobial peptide.

8. The contact lens of claim 1, wherein the contact lens sustains release of the cationic polymer for at least 8 hours.

9. The contact lens of claim 1, wherein the packaging solution comprises from about 50 ppm to about 10,000 ppm of the cationic polymer prior to contact with the hydrogel.

10. The contact lens of claim 1, wherein the packaging solution has an ionic strength of less than about 0.15.

11. The contact lens of claim 1, wherein the monomer mixture further comprises at least one hydrophilic monomer selected from N-vinyl-N-methylacetamide (VMA), N-vinyl pyrrolidone (NVP), or a combination thereof.

12. An unworn silicone hydrogel contact lens immersed in a packaging solution and sealed in a package, said contact lens comprising a hydrated polymerization product of a monomer mixture comprising: at least one silicone monomer; at least one hydrophilic monomer selected from N-vinyl-N-methylacetamide (VMA), N-vinyl pyrrolidone (NVP), or a combination of both VMA and NVP; and at least one carboxylic-acid-containing monomer in an amount to provide the hydrated polymerization product with an ionic content of about 1.0% to about 2.2%.

13. The contact lens of claim 12, wherein the carboxylic-acid containing monomer is selected from (meth)acrylic acid, acrylic acid, crotonic acid, and trimethylsilyl methacrylate.

14. The contact lens of claim 12, wherein the ionic content is about 1.0% to about 2.0%.

15. The contact lens of claim 12, wherein the ionic content is about 1.6% to about 1.8%.

16. The contact lens of claim 12, wherein the monomer mixture comprises about 25 wt. % to about 75 wt. % of the hydrophilic monomer.

17. The contact lens of claim 12, wherein the monomer mixture comprises about 35 wt. % to about 55 wt. % of VMA.

18. The contact lens of claim 12, further comprising a cationic polymer having a molecular weight of about 2,000 to 30,000 electrostatically attached to the hydrated polymerization product, wherein the contact lens sustains release of the cationic polymer for at least 6 hours.

19. A method of replenishing the contact lens of claim 1 with cationic polymer after it has been worn, comprising storing the worn contact lens in a multi-purpose contact lens care solution (MPS) that comprises additional cationic polymer, wherein the additional cationic polymer incorporates into the contact lens during the storage.

20. A method of manufacturing the silicone hydrogel contact lens of claim 1, said method comprising: polymerizing the monomer mixture to provide a lens-shaped polymerization product; optionally hydrating the polymerization product to form a hydrogel; immersing the polymerization product or hydrogel in the packaging solution; sealing the package; and optionally sterilizing the sealed package by autoclave.

21. The method of claim 19, wherein the monomer mixture comprises trimethylsilyl methacrylate (TMSMA) and wherein the monomer mixture is polymerized in a polypropylene mold.

* * * * *